United States Patent [19]

Muschany

[11] Patent Number: 4,627,007

[45] Date of Patent: Dec. 2, 1986

[54] SYSTEM FOR PROCESSING POULTRY CARCASSES

[75] Inventor: Theodore R. Muschany, Hoffman Estates, Ill.

[73] Assignee: Swift & Company, Oak Brook, Ill.

[21] Appl. No.: 584,808

[22] Filed: Feb. 29, 1984

[51] Int. Cl.$^4$ .................. G06F 15/46; A22C 21/00
[52] U.S. Cl. .................. 364/550; 364/478; 99/486; 17/45
[58] Field of Search .......... 99/532, 533, 486; 33/174 L, 138, 179; 364/478–479, 550, 468, 567; 17/45

[56] References Cited

U.S. PATENT DOCUMENTS

| | | | |
|---|---|---|---|
| 3,507,207 | 4/1970 | Rogers et al. | 99/257 |
| 3,511,164 | 5/1970 | Strandine et al. | 99/257 |
| 3,556,808 | 1/1971 | Panek | 99/107 |
| 3,675,567 | 7/1972 | Rejsa et al. | 99/257 |
| 3,682,087 | 8/1972 | Panek | 99/256 |
| 3,739,713 | 6/1973 | Kudale et al. | 99/487 |
| 3,804,954 | 4/1974 | Clardy | 426/230 |
| 3,814,007 | 6/1974 | Lumby et al. | 99/532 |
| 3,850,090 | 11/1974 | Walters et al. | 99/533 |
| 3,979,835 | 9/1976 | Sumption et al. | 33/169 B |
| 4,071,957 | 2/1978 | Sumption et al. | 33/174 L |
| 4,360,887 | 11/1982 | Wilson et al. | 364/478 X |
| 4,483,047 | 11/1984 | Linville, Jr. | 364/478 X |
| 4,514,816 | 4/1985 | Ollus et al. | 364/478 |

*Primary Examiner*—Edward J. Wise
*Attorney, Agent, or Firm*—Haight, Hofeldt Davis & Jambor

[57] ABSTRACT

An automatic system for processing poultry carcasses such as turkeys and the like which vary in size and shape as they are being conveyed on a conveyor is disclosed. The weight of the carcass is determined by a weighting system and the relative position of a preselected portion of the anatomy of the carcass such as the anterior or posterior edges of the breast is ascertained by a photosensor as the carcasses are being conveyed. A data processing computer receives the weight and position data for each carcass and causes a tool such as a needle to inject a basting additive to move to a position where the tool can perform the desired task, i.e., insertion of the needle at the preselected position on the carcass. A measured amount of the basting additive is automatically injected depending upon the measured weight of each of the carcasses. The carcasses are removed from the conveyor at discharge points depending on the weight and rated quality of the carcass.

16 Claims, 22 Drawing Figures

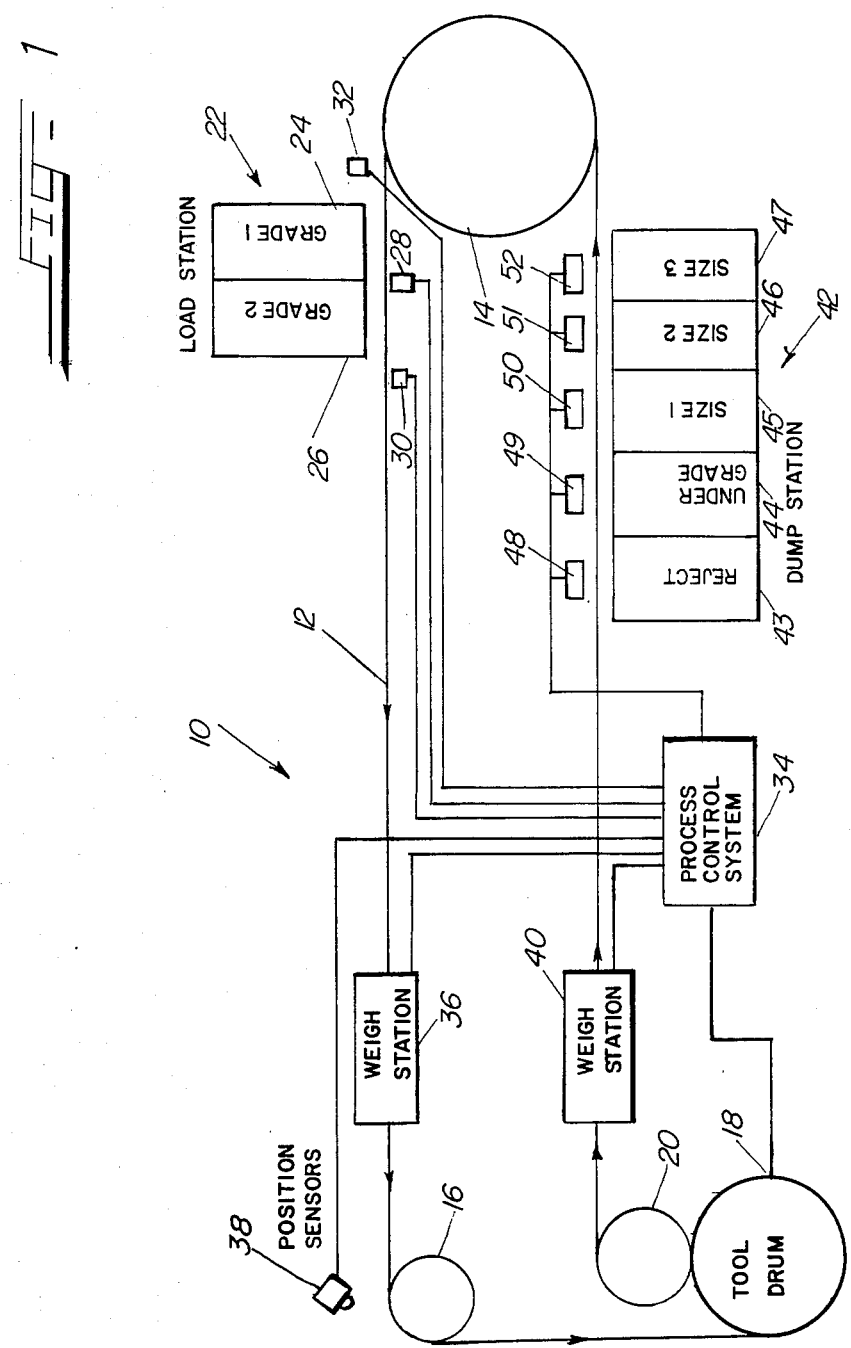

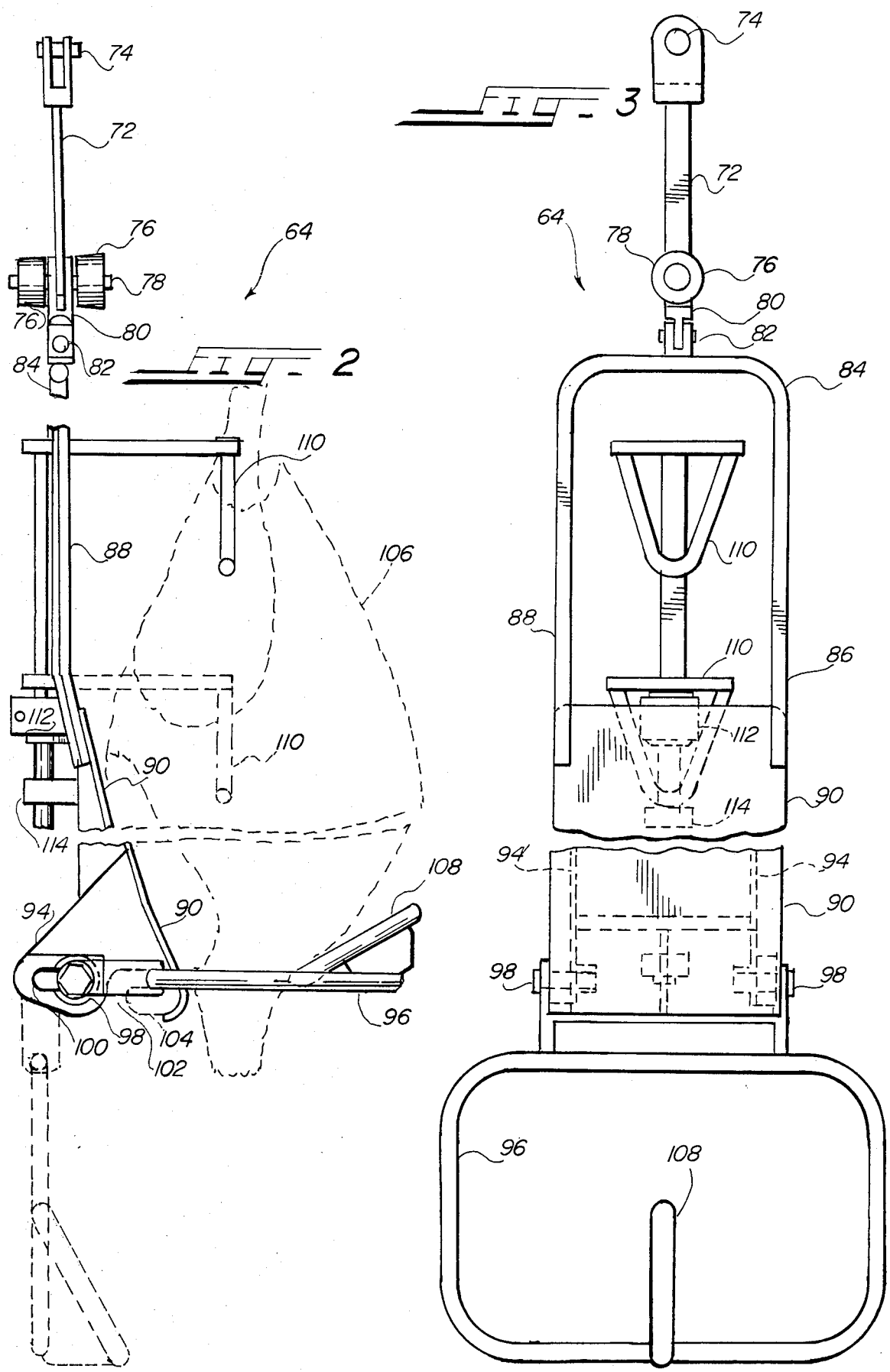

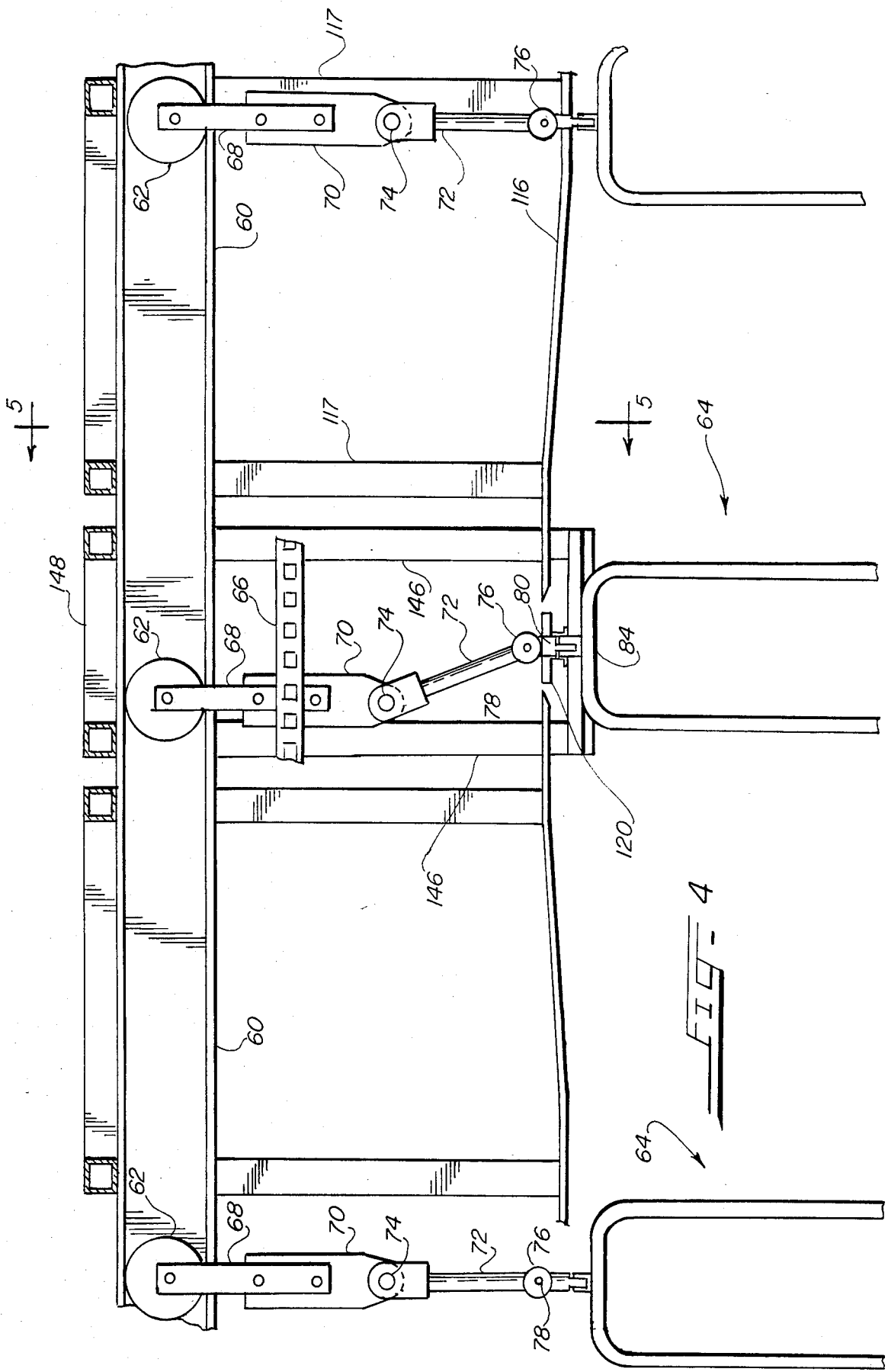

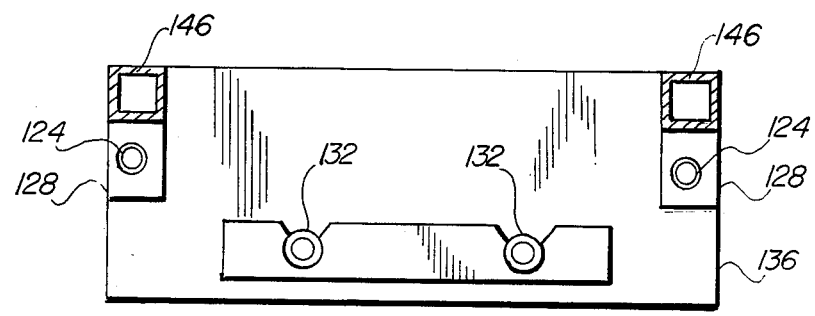
FIG. 7
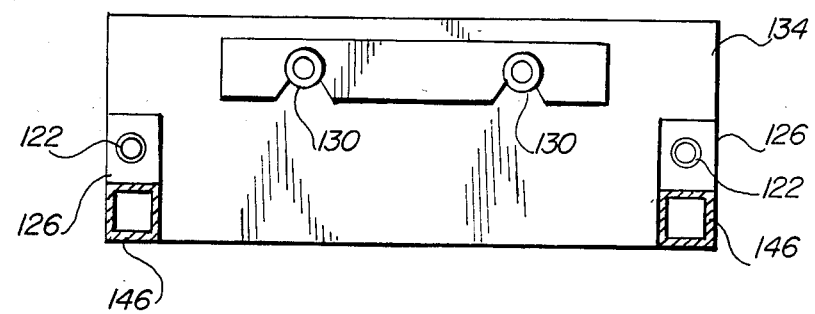
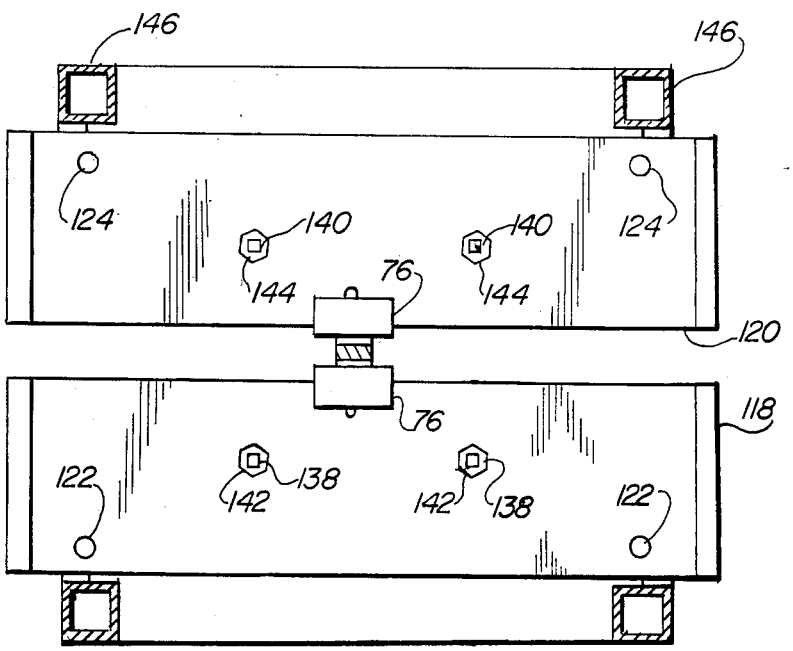
FIG. 6

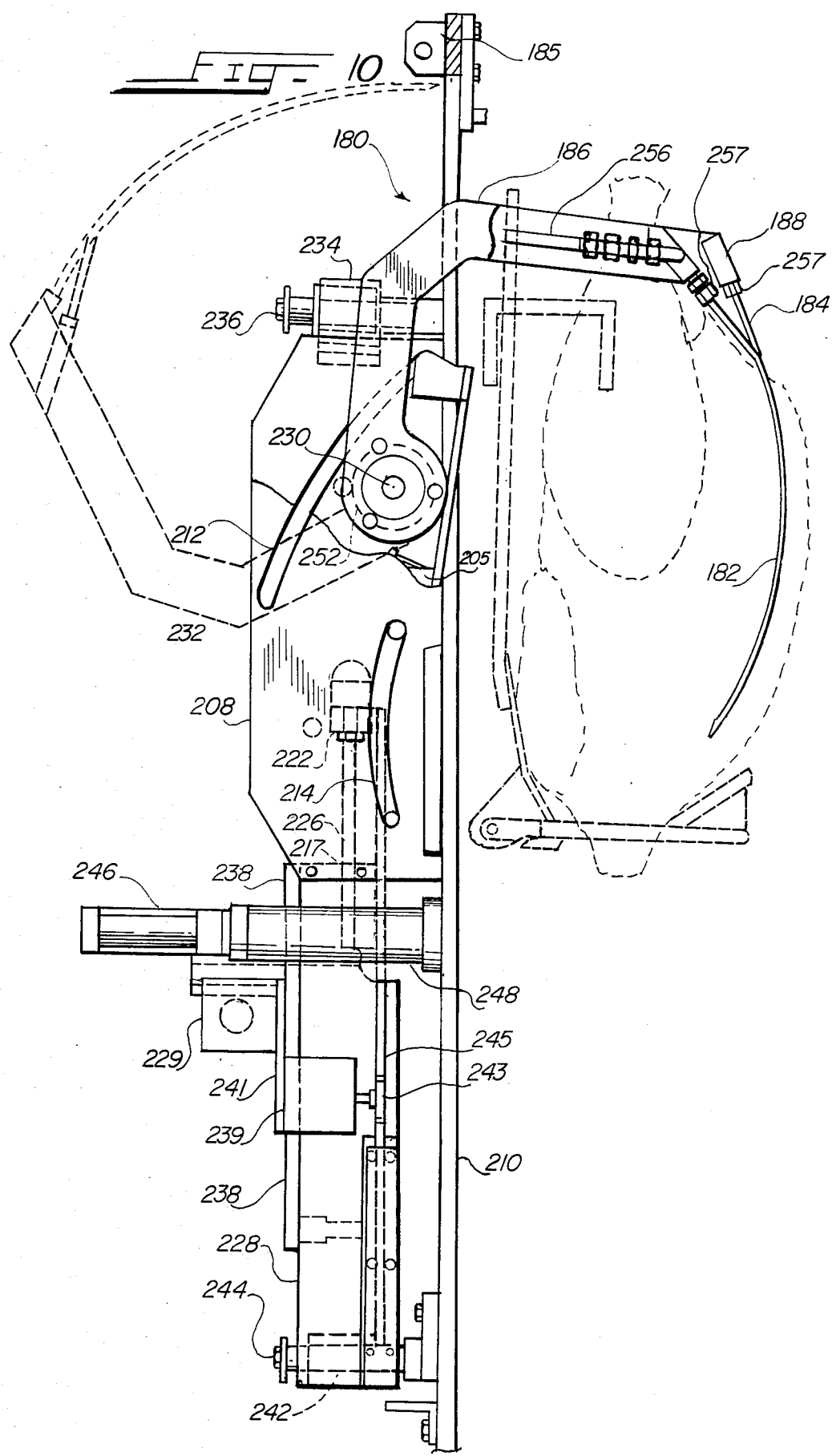

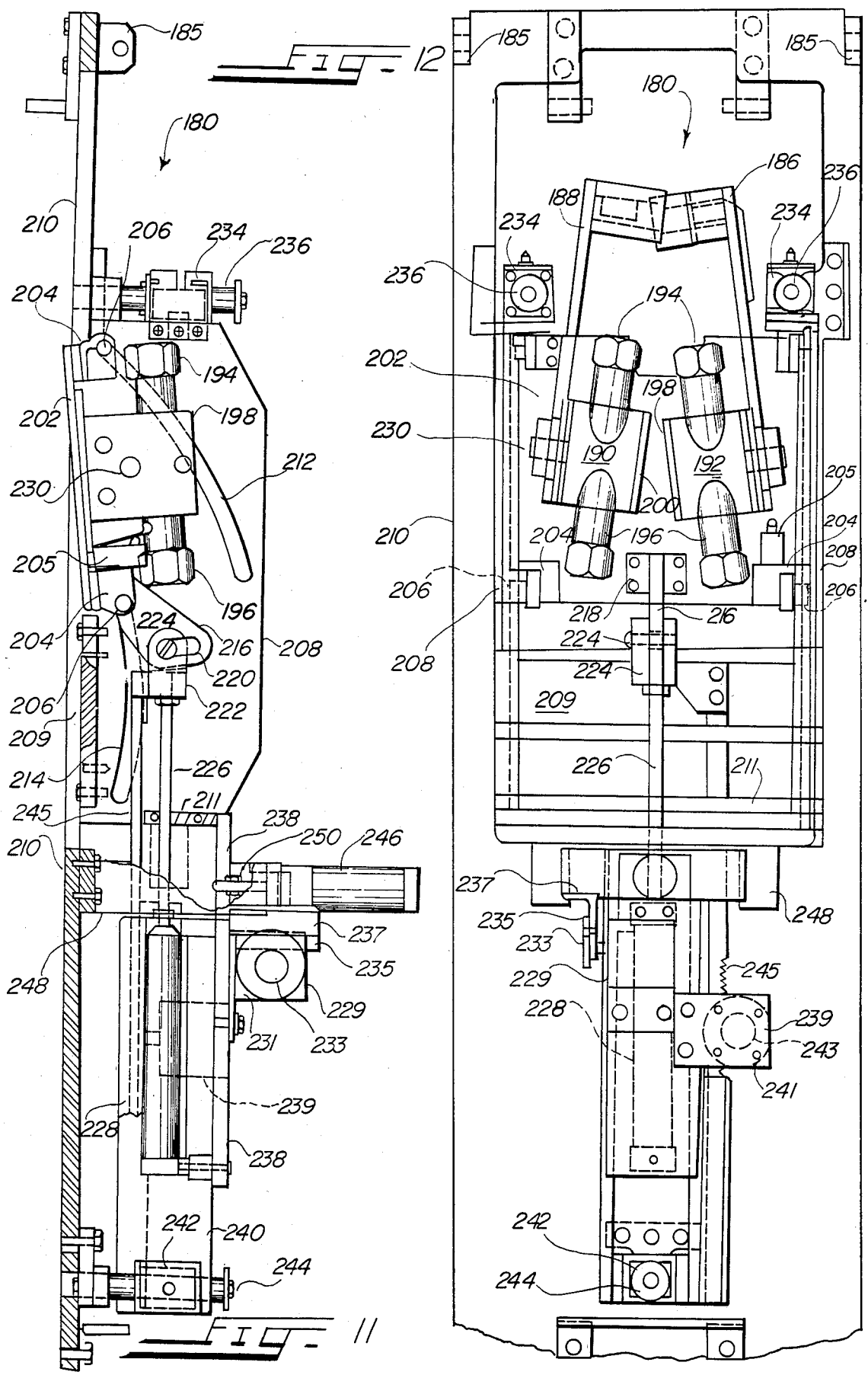

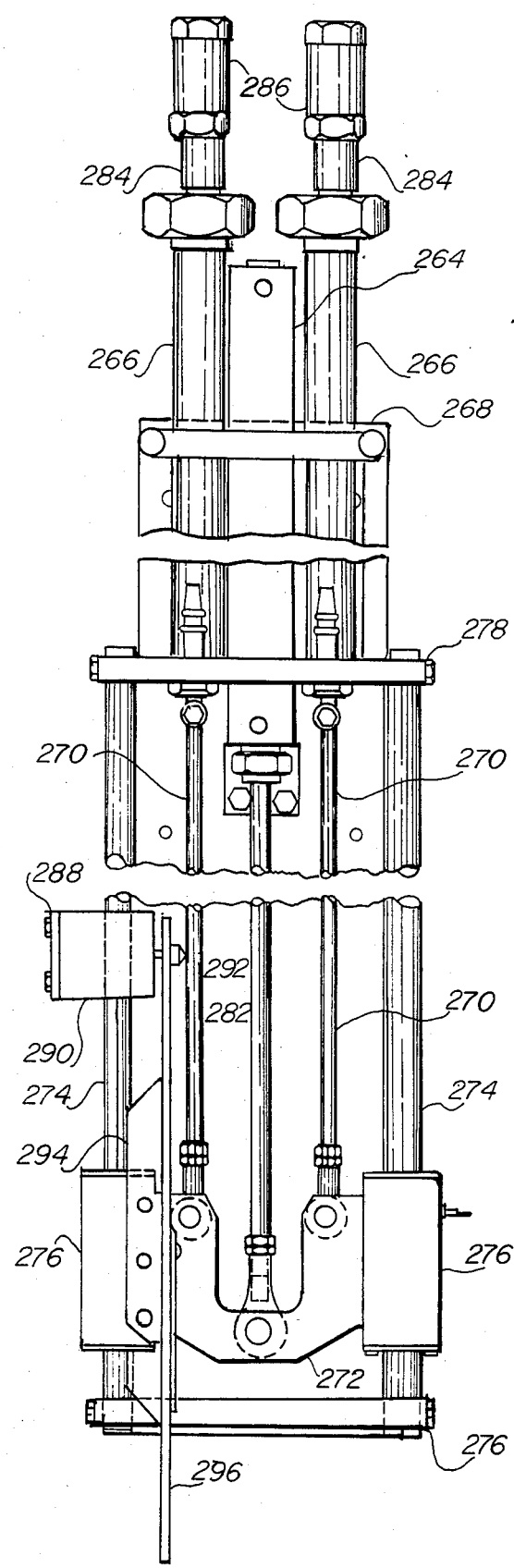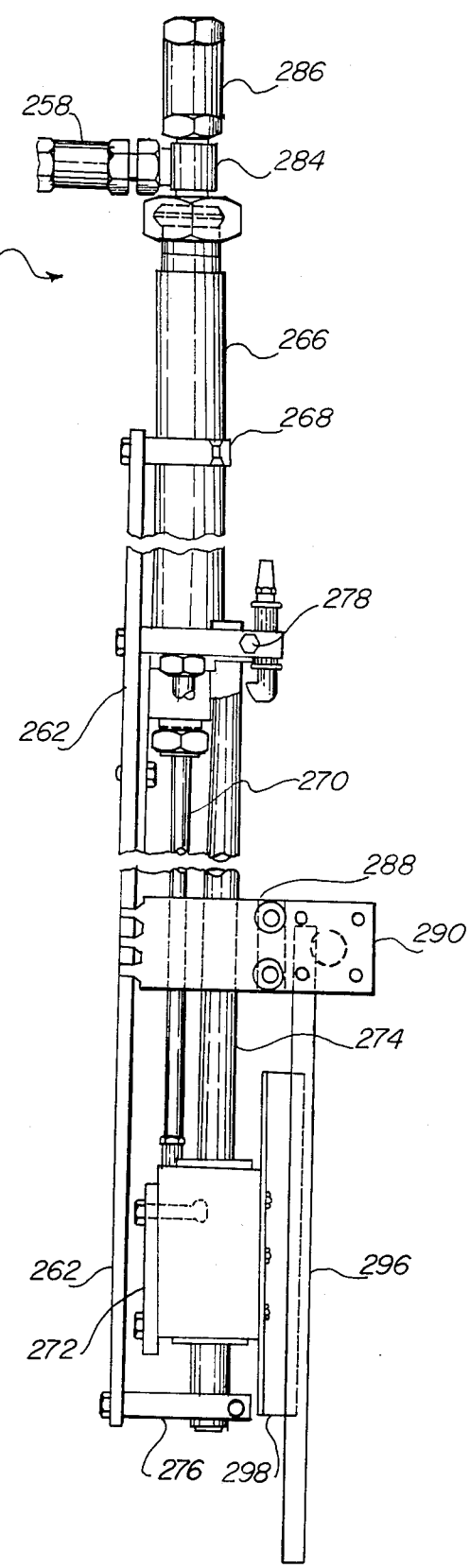

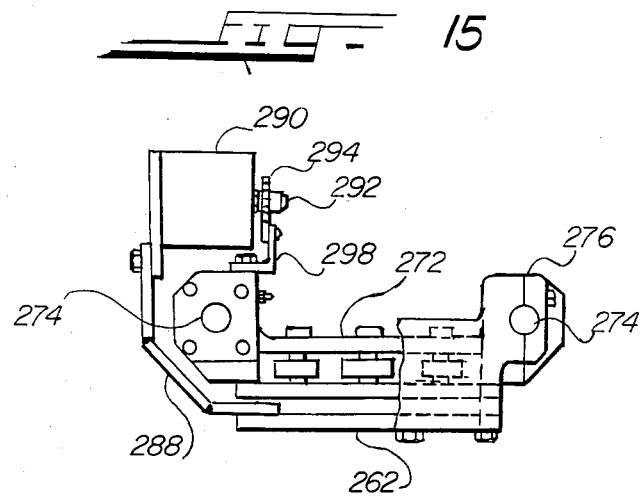
FIG. 15
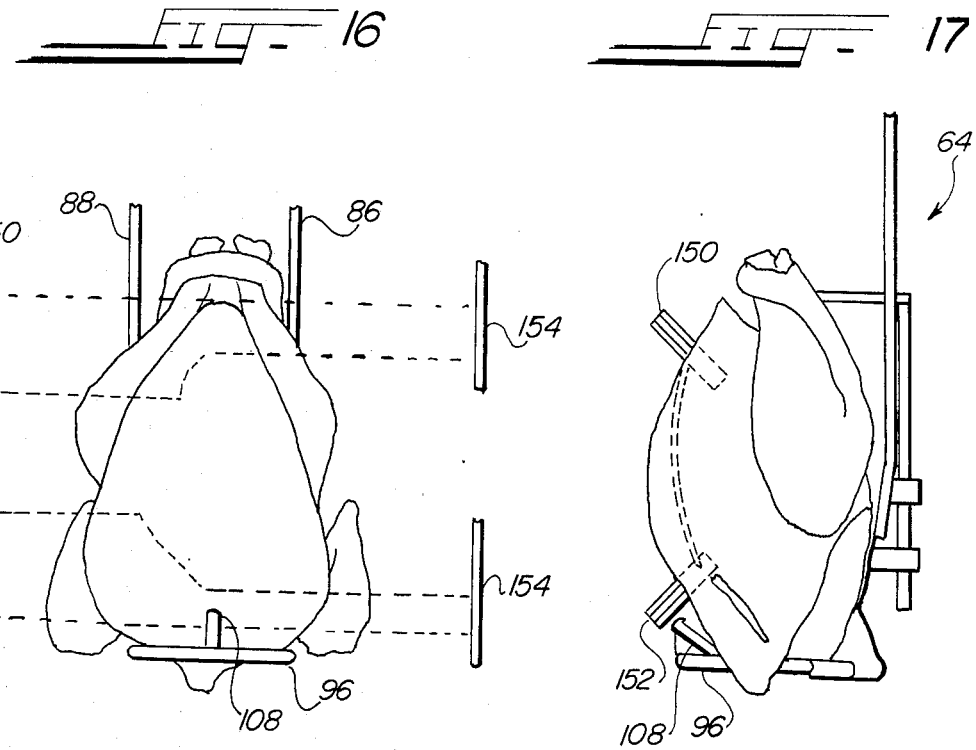
FIG. 16
FIG. 17

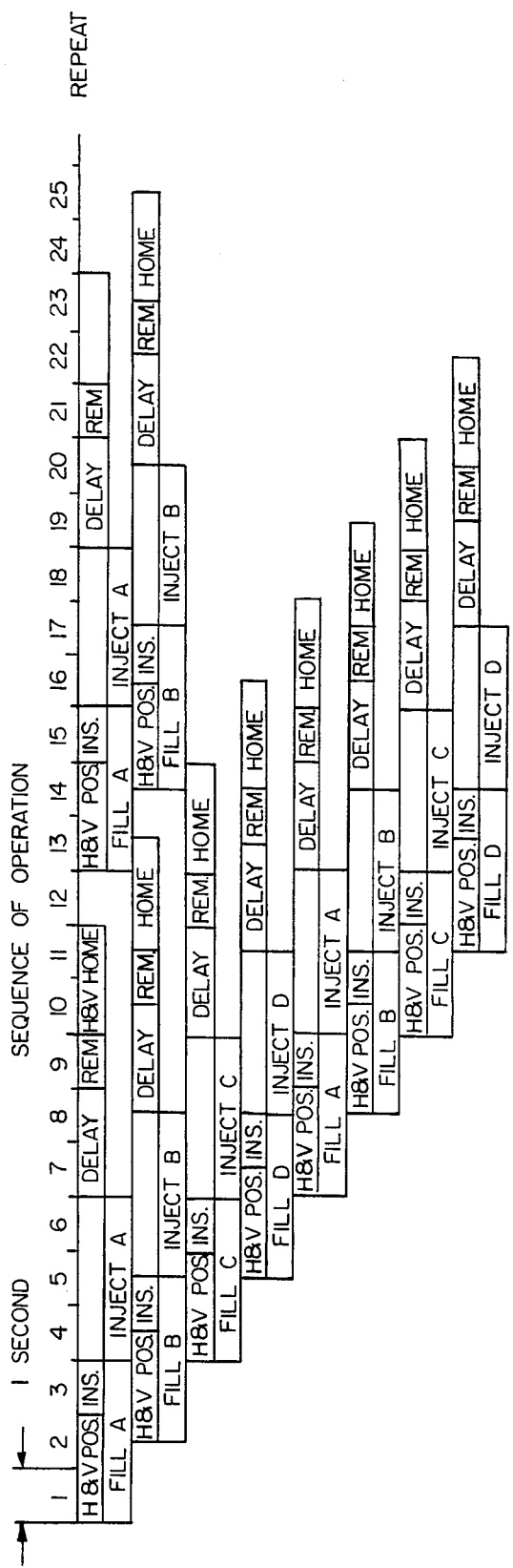

SYSTEM FOR PROCESSING POULTRY CARCASSES

BACKGROUND OF THE INVENTION

1. Field of the Invention

The present invention relates to systems for processing poultry carcasses and more particularly a system for automatically injecting a flavor-enhancing additive into the poultry carcass at a pre-selected point on the carcass in an amount dependent upon the weight of the carcass.

2. Description of the Prior Art

It has been known for years that the injection of various flavor-enhancing additives such as edible animal or vegetable oils into poultry flesh is beneficial. Various manual systems for injecting a flavor-enhancing additive into the poultry carcass are known to the art. For example, U.S. Pat. Nos. 3,511,164 and 3,682,087 disclose a hand-held tool for simultaneously injecting a flavor-enhancing additive into both breast muscles of a turkey carcass. U.S. Pat. Nos. 3,804,954 and 3,556,808 disclose means of controling the amount of flavor-enhancing additive manually injected dependent upon the measured weight of the carcass.

All of the systems known to the prior art for injecting flavor-enhancing additives into poultry carcasses are manually controlled because the wide disparity in the size and shape of poultry carcasses has previously made automatic mechanical systems capable of injecting the fluid at the proper position of the carcass infeasible. The additive is typically injected in the pectoralis superficialis muscle (breast) of the turkey adjacent the wishbone. To avoid penetration of the carcass skin, the needle is inserted longitudinally along the muscle fiber from the posterior edge adjacent the posterior evisceral vent opening, after the skin has been partially pulled away. Because turkey carcasses vary substantially in both size and shape, the exact point of needle insertion varies from carcass to carcass. Thus, manual systems heretofore have been the only feasible method of properly injecting all sizes of carcasses at the correct location on all carcasses. Similarly, automatic systems for other aspects of carcass processing such as evisceration, etc. have been infeasible for carcasses that vary significantly in size and shape since the exact position of the evisceral opening or other critical portion of the anatomy of the carcass varies from carcass to carcass.

The present system overcomes the deficiencies in the prior art by providing a fully automated system that determines the relative position of the critical portions of the anatomy of each carcass as it is being conveyed. The carcass processing tool is then moved to the correct position so that the desired task can be performed, i.e., evisceration or needle insertion. The system may also weigh the carcass and automatically adjust the amount of flavor-enhancing additive injected in proper proportion to the carcass weight.

BRIEF SUMMARY OF THE INVENTION

A system for processing poultry carcasses in accordance with the present invention comprises a data processing means for receiving and storing data, manipulating the data in a predetermined manner and providing output control signals in accordance with the manipulation of that data. Means to convey the poultry carcasses from a loading point to a discharge point is provided. A means to sense the position of at least one preselected part of the anatomy of said carcass relative to the means to convey as the carcass is being conveyed and provide data indicative of that position to the data processing means is provided. Tool means for performing a desired function on the carcass is adapted to move with the carcass as it is being conveyed by the means to convey. Means to move the tool means relative to the means to convey to a desired position relative to the position of the preselected part of the carcass anatomy in response to signals from the data processing means is provided so that the tool means can perform the desired function at the predetermined position on the carcass as the carcass is being conveyed by the means to convey.

The tool means may comprise a means for injecting a liquid additive into the carcass. A means to weigh the carcass as it is being conveyed may also be provided so that data indicative of the weight of each carcass is transmitted to the data processing means. The amount of additive injected into the carcass can be controlled by a means to control in response to control signals from the data processing means determined from the data indicative of the weight of the carcass.

The means for injecting may comprise one or more hollow needles having at least one opening at each end, at least one hollow cylinder with a circular piston within the cylinder adapted to move within the cylinder to change the internal volume of the cylinder. A source of additive is provided and connected via a hollow tube to one side of a two-way check valve mounted at the outlet of the cylinder. The other side of the two-way check valve is connected through a hollow tube to the needle. The movement of the piston is controlled by control means responsive to control signals from the data processing means so that the piston moves to expand the internal volume of the cylinder until the proper amount of additive is drawn into the cylinder and then moves the piston to reduce the internal volume to cause the additive to be conveyed through the tube and needle into the carcass.

The means to sense the position of at least one part of the anatomy of said carcass may comprise a means for providing an elongated beam of infrared light through the expected path of travel of the predetermined part of the anatomy of the carcass as it is being conveyed. A means to sense the position of the edge of said carcass as it travels through the elongated beam of infrared light provides data to the data processing means indicative of that position relative to the means to convey.

The present invention also comprises a means of removing the carcass from the means to convey at different preselected points corresponding to preselected weight ranges of the carcass in response to control signals from the data processing means determined by the measured weight of the carcass.

Means may also be provided to sense the rated quality of the carcass as it is conveyed and transmit data indicative of that carcass's rated quality to the data processing means. The data processing means can then control the tool means in such a manner as to eliminate injection of carcasses that do not meet predetermined quality requirement. The data processing means can also cause the carcasses to be removed from the conveying means at preselected different points determined by the rated quality of the carcass.

Accordingly, it is an object of the present invention to provide a fully-automated system for performing desired tasks on poultry carcasses of varying size and shape while the carcasses are being conveyed on a conveyor system.

It is yet another object of the present invention to provide an automated system for injecting a flavor-enhancing additive into poultry carcasses in proper proportion to the weight of the carcass and at the proper position in the carcass as the carcass is being conveyed on a conveyor system.

It is yet another object of the present invention to provide an automated system for processing poultry carcasses that automatically weighs the poultry carcass as it is being conveyed and removes the carcass from the conveyor system at preselected points depending upon the measured weight of the carcass.

Yet another object of the present invention is to provide a fully-automated system for processing poultry carcasses that automatically senses the rated quality of the carcass as it is being conveyed and controls the processing and discharge of the carcass dependent upon the rated quality.

It is yet another object of the present invention to provide an automated system for processing poultry carcasses that senses the position of preselected portions of the anatomy of the carcass and moves a tool means in relation to those sensed portions of the carcass so that the tool can perform a desired task at a desired point on the carcass.

These and other objects, advantages, and features shall hereinafter appear, and for the purposes of illustration, but not for limitation, an exemplary embodiment of the present invention is illustrated in the accompanying drawings.

BRIEF DESCRIPTION OF THE DRAWINGS

FIG. 1 is a block schematic diagram of the poultry processing system in accordance with the present invention.

FIG. 2 is a side view of a poultry holding shackle for the conveyor of the processing system in accordance with the present invention.

FIG. 3 is a front view of the shackle illustrated in FIG. 2 showing the O-shaped neck ring in the lowered position.

FIG. 4 is a side view of the weight sensing apparatus in accordance with the present invention.

FIG. 6 is a top cross-sectional view taken substantially along line 6—6 in FIG. 5.

FIG. 10 is a side view of the tool-positioning apparatus in accordance with the present invention.

FIG. 11 is a side partially cross-sectional partially segmented view of the tool positioning apparatus illustrated in FIG. 10.

FIG. 12 is a front view of the tool positioning apparatus illustrated in FIGS. 10 and 11.

FIG. 13 is a side view of the additive metering system in accordance with the present invention.

FIG. 14 is a front view of the additive metering system illustrated in FIG. 13.

FIG. 15 is bottom partially fragmentary view of the additive metering system illustrated in FIGS. 13 and 14.

FIG. 16 is a front view of a poultry carcass as it is being conveyed in a shackle showing the relative position of the light sensors of the present invention.

FIG. 17 is a side view of the poultry carcass illustrated in FIG. 16 showing the relative position of the infrared light sensors.

FIG. 21 is a time sequence graph showing the various operations performed in time sequence by the system of the present invention.

DETAILED DESCRIPTION OF THE PREFERRED EMBODIMENT

Figure 5:
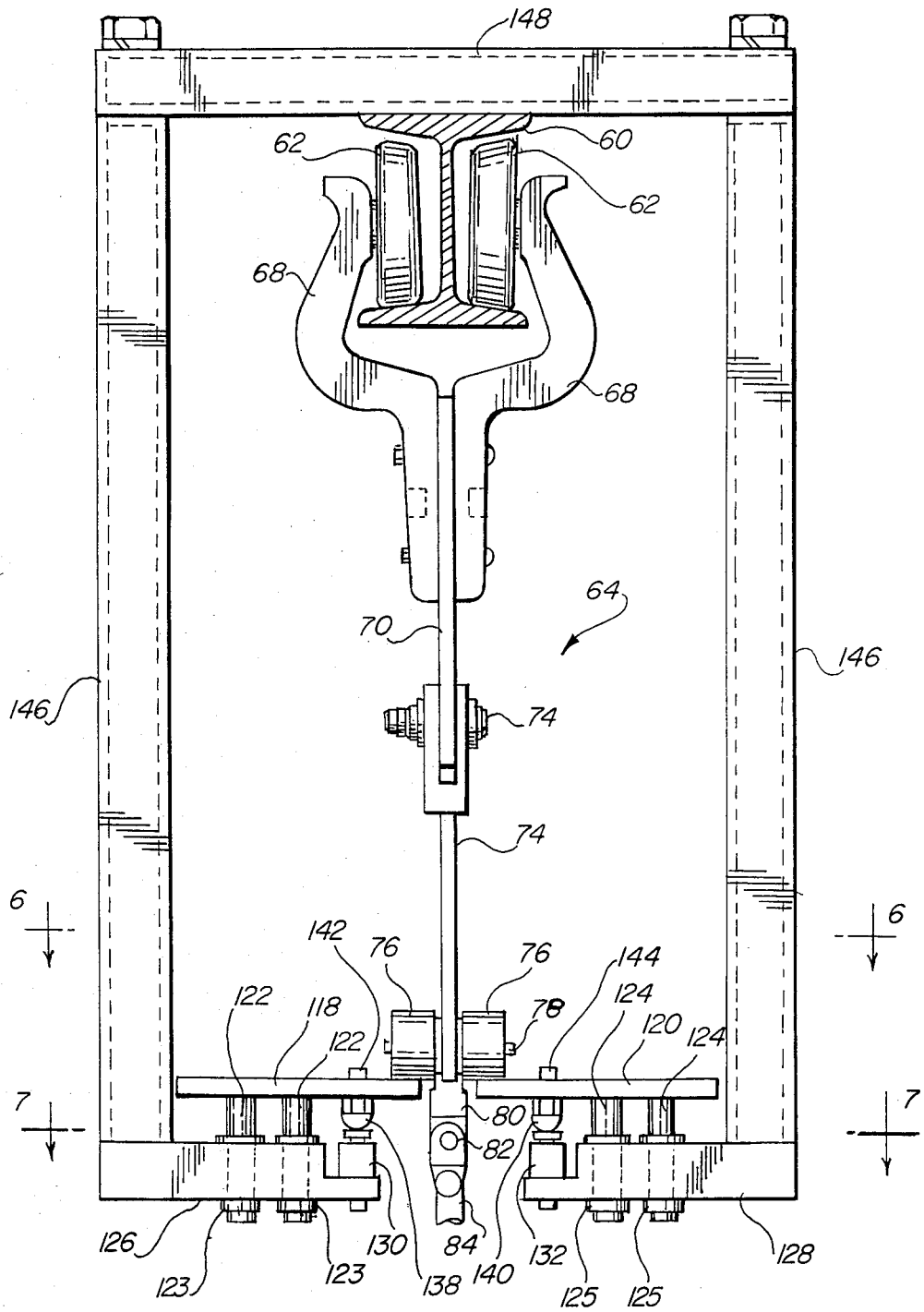
FIG. 5 is an end view of the weight sensing apparatus taken substantially along line 5—5 in FIG. 4.
Figure 7:
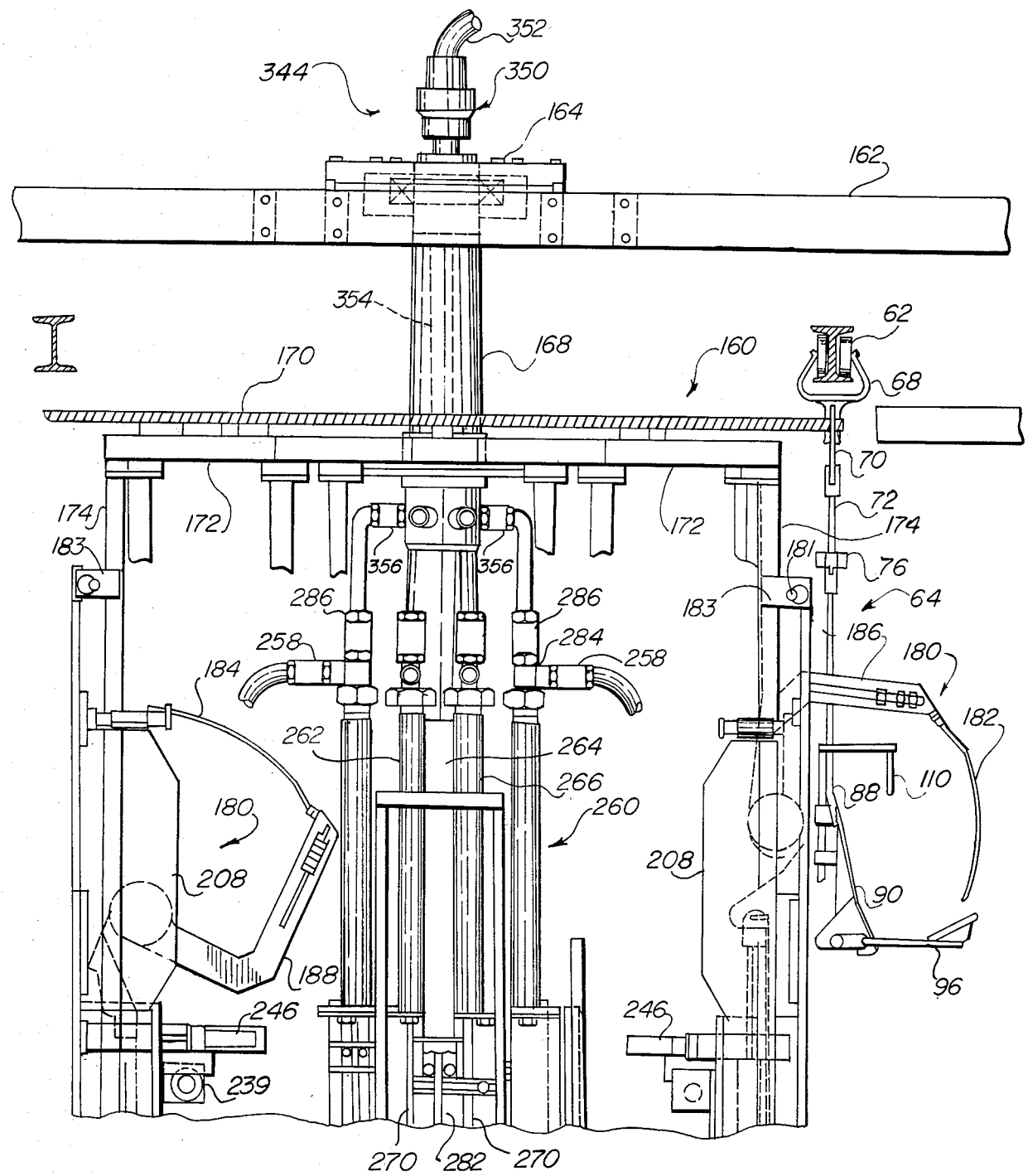
FIG. 7 is a top cross-sectional view taken substantially along line 7—7 in FIG. 5.

With reference to FIG. 1, a system for processing poultry carcasses 10 in accordance with the present invention comprises a conveying system 12 graphically illustrated by a straight line representing the conveyor chain and track and arrows indicating the direction of travel around various pivotably mounted drums 14, 16, 18 and 20. Conveyor system 12 can comprise a standard chain conveyor that moves periodically spaced carcass supporting shackles along a track. Drum 14 is a drive drum that drives the chain around the remaining drums. Drums 14, 16, and 20 principally serve as direction changing drums for the conveyor system. Drum 18 is a tool supporting drum that allows tools for performing various desired tasks on the poultry carcasses to move with the conveyor system for a period of time. Load station 22 comprises two different loading points 24 and 26 for two rated grades of carcasses. Poultry carcasses may be graded by various means such as color, appearance, skin blemishes, etc. Carcasses of a first grade are loaded at loading point 24 and carcasses of a second grade may be loaded at loading point 26. Grade sensing devices 28 and 30 sense the presence of a carcass on the conveying system 12 as the carcasses passes the respective sensor and conveys that information to a process control system 34. Process control system principally comprises a digital computer as will be more fully described below.

There are a predetermined number of poultry supporting shackles on the conveying system 12 and a shackle start count sensor 32 is provided to determine when the first and each subsequent one of the predetermined number of shackles starts past load station 22 so that the process control system can keep track of the shackles and the subsequent information and operation for each carcass. If a carcass is loaded at loading point 24, sensor 28 senses the presence of the carcass as it passes and that information indicative of the rated quality is transmitted to the process control system 34 and recorded in memory along with the respective shackle number. Similarly, if a carcass is loaded at point 26, sensor 30 senses the presence of the carcass and that information indicative of the rated quality and corresponding shackle number are recorded in memory by process control system 34. Typically, the carcasses are loaded immediately after removal from the chill tank so the conveyor also serves the purpose as a drying line.

The carcasses are then conveyed by the conveying system 12 to a first weigh station 36 where the weight of the carcasses is measured while the carcass is being conveyed. That weight information is transmitted to the process control system and recorded for each corresponding shackle number. The carcasses are then conveyed to direction changing drum 16 where, as they are rotated around drum 16 and the direction of travel is changed 90°, position sensors 38 photo-optically sense the position of predetermined portions of the anatomy of the carcass relative to the conveyor shackle. That position information is transmitted to the process control system and recorded in memory for each respective shackle number for further use to position the tool on the tool drum 18 as will be explained below.

The carcasses continue to be conveyed by conveying system 12 to tool drum 18. Tool drum 18 supports tools for performing a desired task on the carcass. In the case of the preferred embodiment of the present invention, the desired task is the injection of a flavor-enhancing basting additive comprising an edible liquid vegetable oil into the carcass. However, other desirable tasks such as evisceration, neck removal, etc. might also similarly be performed.

The process control system 34 controls the operations of the tools on tool drum 18. In the case of the preferred embodiment, the process control system controls the positioning of the tools based upon carcass position data from sensors 38 and the measurement of the amount of basting additive to be injected into each carcass based on the weight of the carcass measured by weigh station 36. In the preferred embodiment injecting needles are inserted about one inch below the posterior edge of the breast of the turkey and inserted longitudinally along the breast to a point above ½ inch below the surface adjacent the wish bone. The process control system then causes the injection of the additive and the return of the tool to the ready position ready for the next carcass.

A direction changing drum 20 is provided in a position such that the carcasses remain on tool drum throughout three-fourths of the rotation of the tool drum 18. This increases the time that the tools are moving with the conveyed carcasses so that adequate time is provided to perform the desired task. After the carcasses leave direction changing drum 20, they are conveyed to a second weigh station 40 which again weighs the respective carcasses and transmits that information to the process control system for recording with the respective shackle number. The process control system compares the weights determined by weigh stations 36 and 40 to determine whether the proper amount of basting additive has been injected.

The carcasses are then conveyed to dump station 42 which comprises reject dump point 43, undergrade dump point 44, size one dump point 45, size two dump point 46, and size three dump point 47. Corresponding dump cylinders 48, 49, 50, 51, and 52 operate under the control of process control system 34 to remove the carcasses from the shackles at the corresponding dump points depending upon the recorded grade and size of the carcass. If a carcass has been injected with an improper amount of additive, the carcasses are rejected and removed at point 43. If the carcasses were rated as undergrade depending on the point at which they were loaded at load station 22, the process control system will remove the carcass at point 44. To facilitate the packaging of carcasses, carcasses within certain weight ranges are ejected at the different size points 45, 46 and 47 as ascertained by the process control system 34. Thus, smaller carcasses may be removed at point 45 and larger carcasses at point 47, for example, to simplify packaging.

With reference to FIGS. 2, 3, 4, and 5, the conveying system 12 in accordance with the present invention comprises a hot dip galvanized I-beam track 60 that acts to support rollers 62 (see FIG. 5) of shackle assembly 64. A chain drive 66 (a representative section shown in FIG. 4) is attached to each shackle assembly 64 and is driven by drum 14 to move shackle assemblies 64 along track 60 and around the drums 14, 16, 18, and 20.

With reference to FIG. 5, rollers 62 are pivotably mounted to a U-shaped yoke 68. Yoke 68 comprises a downwardly extending member 70, and a shackle link 72 is pivotably mounted to member 70 by a pin 74 so that shackle link 72 can freely pivot around pin 74. Two roller bearings 76 are mounted at the opposite end of shackle link 72 by a pin 78. Bearings 76 allow shackle assembly 64 to roll across a weight sensor assembly with minimal friction as will hereinafter be described.

Pin 78 also pivotably attaches a U-shaped link 80 to shackle link 72. A pin 82 pivotably attaches shackle weldment 84 to the bottom of link 80.

With reference to FIGS. 2 and 3, weldment 84 comprises two downwardly extending arms 86 and 88 at the end of which is welded a carcass supporting plate 90. Plate 90 extends downwardly at an angle approximating the curvature of the back of a turkey carcass. At the lower end of plate 90, two perpendicularly extending plates 94 are welded. An O-shaped neck ring 96 is pivotably mounted by bolts 98 through a slot 100 at the rear of plates 94. Plates 94 also have an open ended slot 102 formed to retain one side of O-shaped neck ring 96 as illustrated in FIG. 2. However, as may be seen, if ring 96 is moved to the left as illustrated in FIG. 2 by the actuation of dump cylinders 48–52, ring 96 clears the supporting surface 104 of groove 102 allowing ring 96 to pivot downwardly around bolts 98 to the position illustrated in dotted lines in FIG. 2, and the solid lines in FIG. 3. This allows the carcass 106 (shown in dotted lines) to drop out of the shackle assembly 64.

Mounted on the outwardly extending side of neck ring 96 is a breast positioning arm 108. Arm 108 rests against the anterior surface of the breast of the carcass 106 and acts to press the back of the carcass 106 against plate 90. A posterior locator 110 is slidably mounted to move vertically in two slide fittings 112 and 114 so that the end of locator 110 may be inserted into the posterior evisceral vent opening of the carcass when the carcass is loaded so that the carcass 106 is maintained in a vertical upside down position as illustrated.

With reference to FIGS. 4 and 5, as shackle assembly 64 is being conveyed by chain drive 66 along I-beam track 60, all the weight of the shackle and carcass is normally carried by rollers 62. However, as the shackle approaches the weigh station 36, roller bearings 76 engage a ramp 116 (see FIG. 4) connected to track 60 by frame 117 causing the weight of shackle 64 to be transferred from roller 62 to roller bearings 76 as link 72 pivots about pins 74 and 78. As shackle assembly 64 is moved, roller bearings 76 engage support plates 118 and 120 which are mounted to move freely in a vertical direction. Plate 118 is supported for vertical movement by a cylindrical members 122 that slide freely in linear bearings 123 mounted in circular openings in base support plate 126. Plate 120 is supported by vertical movement by cylindrical members 124 that slide freely through linear bearings 125 mounted in circular openings through base support plate 128.

Weight sensing devices 130 and 132 are mounted on the base plates 126 and 128 respectively immediately below contact members 138 and 140 respectively attached to plates 118 and 120 by bolts 142 and 144. Plates 126 and 128 are mounted in cantilever fashion to the bottom of downwardly extending frame members 146. Frame members 146 are attached to a box member 148 which is welded to the top of I-beam 60.

As may be seen in FIG. 4, when roller bearings 76 engage plates 118 and 120 the entire weight of shackle 64 and any carcass supported by shackle assembly 64 is pressing downwardly on plates 118 and 120. Since cylindrical members 122 and 124 move freely through the linear bearings in plates 126 and 128, the entire weight is transmitted through contact members 138 and 140 to weight sensing devices 130 and 132. Weight sensing devices 130 and 132 may be of a variety of forms that transmit an electrical potention or signal corresponding to the force exerted against them. Thus, process control system 34 can be calibrated to ascertain the weight of any carcass on shackle assembly 64 within reasonable limits by interpreting the weight signal and subtracting the shackle weight.

With reference to FIGS. 1, 16 and 17, position sensors 38 comprise in the preferred embodiment infrared light heads 150 and 152 capable of emitting a thin elongated beam of infrared light. Heads 150 and 152 also sense the reflected return of any portion of that thin beam of light and provide a signal indicative of the exact portion of that returned beam. In the preferred embodiment, the infrared sensor comprises the commercially available Opcon's 1471 Curtain of Light Head. Infrared light heads 150 and 152 are positioned along the path of travel of the carcass when conveyed in shackle assembly 64 such that as the carcass makes the 90° turn around drum 16 the carcass passes through the respective elongated light beams of light heads 150 and 152. A non-reflective background 154 is provided opposite each light head so that only the infrared light reflected from the carcass surface is sensed by heads 150 and 152.

As may be seen more clearly in FIG. 17, heads 150 and 152 are positioned at an angle approximately perpendicular to the edge of the breast bone of the turkey carcass. Thus, that portion of the elongated beam of light below the edge of the carcass is reflected and sensed by heads 150 and 152 thereby locating the edge of breast muscle. In the present embodiment, the desired task to be performed by the tool is the injection of a basting additive into the breast muscle of the turkey. Accordingly, to assure that the injecting needle is inserted at the proper point, it is necessary to ascertain the exact position of the edge of both the anterior and posterior surface of the breast of the turkey in relation to its shackle. Thus, heads 150 and 152 are positioned as shown in FIGS. 16 and 17.

The additive-injecting needle is an elongated curved needle that is inserted at the posterior end of the breast adjacent the evisceral vent opening after the skin has been pulled down so that the needle does not penetrate the skin. The needle enters the carcass approximately one inch from the posterior edge of the breast muscle and is moved longitudinally through the breast muscle (pectoralis superficialis) to a point approximately one inch beyond the breast bone (sternum) adjacent the wish bone and approximately one-half inch from the anterior surface of the breast muscle. Since turkey carcasses vary substantially in size and shape, the position sensing capacity of light heads 150 and 152 provides information as to the approximate starting and ending point of the needle for a particular carcass thereby allowing the needle inserting apparatus to be moved (as will hereinafter be more fully described) to the proper position to permit proper insertion in each respective carcass.

After the light heads 150 and 152 have provided information to the process control system 34 indicative of the relative position of the edges of the posterior and anterior surfaces of the breast of the carcass, this information is recorded in the memory of the process control system for each respective shackle number. The carcasses are then conveyed to the tool drum 18 which is more fully illustrated in FIGS. 8A, 8B, and 9. Tool drum assembly 160 is pivotably mounted on a frame 162 supported above the floor on legs 163. An upper bearing assembly 164 and a lower bearing assembly 166 pivotably support a vertical column 168 that extends through the entire tool drum 160. A chain engaging sprocket 170 is mounted at the upper end of drum 160 to engage the chain 66 so that drum 160 is rotated with the shackle assemblies 64 as they are moved by the drive chain 66.

Drum assembly 160 comprises upper frame members 172 formed in an octagonal configuration immediately below sprocket 170. Vertical support members 174 are mounted to members 172 and extend down to eight bottom support members 176 that are also joined in an octagonal configuration. Spoke members 178 (shown in FIG. 9) extend radially from column 168 to each of the frame members 172 and 176 to form a rigid octagonal-shaped structure around column 168.

Mounted to vertical support members 174 are eight separate injecting assemblies 180. Assemblies 180 are mounted for easy removal for cleaning and repair by pins 181 through brackets 183 on vertical support members 174 and brackets 185 on assemblies 180.

With particular reference to FIGS. 10, 11, and 12, injecting assemblies 180 comprise a first needle 182 and a second needle 184 (behind needle 182 in FIG. 10) for injecting both breast muscles of the turkey simultaneously. Needles 182 and 184 are mounted on pivot arms 186 and 188 (arm 188 is partially obscured in FIG. 10) that are mounted on hydraulic rotary actuators 190 and 192 which are typically connected through hydraulic connectors 194 and 196 to a source of hydraulic pressure (not shown) controlled by solenoid valves 197 (shown in FIGS. 8A, 13 and 14). Application of hydraulic pressure through connections 194 causes pivot arms 188 and 186 to rotate in one direction and the application of hydraulic pressure through fittings 196 causes the arms to rotate in the opposite direction. Rotary actuators 190 and 192 are mounted on brackets 198 and 200 that extend perpendicularly from a carrier plate 202. Mounted at each of the four corners of carrier plate 202 are follower brackets 204 upon which are mounted cam followers 206. A micro switch 205 is mounted on bracket 204 in a position to be engaged by arm 188 when it is in the fully-retracted position. Switch 205 is connected to the process control system 34 so that it will know when it can start the next positioning cycle as will be described below.

Side plates 208 are connected by a side plate spacer member 209 that extends perpendicularly thereto between the side plates 208. Side plates 208 are also connected along their bottom edge by a spacing member 211. Side plates 208 have grooves 212 and 214 formed therethrough along a circular arc, the center of which is a point at the tip of needle 182 and 184 when arms 186 and 188 are in the fully rotated position as illustrated in FIG. 10. Cam followers 206 are dimensioned to freely slide in grooves 212 and 214 so that carrier plate 202 can move in a path of travel defined by grooves 212 and 214. A carrier bracket 216 having a slot 220 is mounted to the bottom edge of carrier plate 202 by bolts 218. A clevis 222 is slidably mounted to bracket 216 by a shoulder bolt 224 in slot 220. Connected to clevis 222 is one end of a rod 226. The other end of rod 226 is connected to a piston (not shown) inside a hydraulic cylinder 228. Hydraulic cylinder 228 is mounted on cylinder frame 238 and is adapted to move rod 226 up and down causing carrier plate 202 to move up and down as cam followers 206 ride in grooves 212 and 214.

Solenoid controlled valves (not shown) control the application of hydraulic fluid to cylinder 228 in a manner hereinafter more fully described to either move rod 226 up or down. As may be seen, movement of rod 226 causes the pivot point 230 of arms 186 and 188 to move along a circular arc as shown by the dotted line 232 in FIG. 10. This changes the point of entry and the angle of travel of needles 182 and 189.

Side plates 208 have linear bearing brackets 234 mounted at the upper edge there. Bearing brackets 234 slidably ride on shafts 236 that are mounted perpendicularly in a cantilever fashion to a frame 210. Mounted to the edge of spacing member 211 and extending downwardly therefrom is a cylinder frame 238. Mounted at the lower end of the side panels 240 of cylinder frame 238 is a lower linear bearing bracket 242 that slidably rides upon a shaft 244 that is mounted in a cantilever fashion perpendicularly to the bottom of frame 210.

A U-shaped bracket 248 is mounted to frame 210 and extends around cylinder frame 238. A hydraulic cylinder 246 is mounted on bracket 248 and the actuator rod 250 of hydraulic cylinder 246 is connected to cylinder frame 238. Operation of hydraulic cylinder 246 through the application of hydraulic fluid moves the entire assembly back and forth on shafts 236 and 244 to cause the pivot point 230 of arms 182 and 184 to move horizontally along a path shown as a dotted line 252 in FIG. 10. Application of hydraulic fluid to cylinder 246 is controlled by solenoid valves (not shown) under the control of the process control system 34 in a manner hereinafter more fully described.

A rotary encoder 229 is mounted on a plate 231 bolted to cylinder frame 238. A gear 233 mounted on the input shaft of encoder 229 engages gear teeth in a linear rack 235 mounted to bracket 248 by flange 237. Another rotary encoder 239 is mounted on a plate 241 attached to frame 238. Encoder 239 also has a gear 243 that engages a linear rack 245 having gear teeth to engage gear 243. Rack 245 is attached to clevis 222 so that it moves up and down with carrier plate 202.

Rotary encoders 229 and 239 are connected to the process control system 34 to provide electrical signals indicative of the exact position of point of rotation 230 of injecting needles 182 and 184 when the hydraulic cylinders are actuated thereby permitting the process control system to accurately position the needles for injection into carcasses that vary in size and shape.

Needles 184 and 182 are connected to tubing 256 by a Swagelock tube fitting 257 to permit easy replacement. Tubing 256 communicates through flexible tubing (not fully shown) to check valves 258 of additive metering system 260 (see FIG. 8A). With reference to FIGS. 13, 14 and 15, additive metering system 260 comprises a mounting plate 262 that is mounted to shaft 168 of tool drum 160. A hydraulic drive cylinder 264 and two additive cylinders 266 are mounted by a bracket 268 attached to the top end of plate 262 and a bracket 278 also attached to plate 262. Additive cylinders 266 are hollow cylinders having an internal piston (not shown) connected to rods 270 that when moved up and down change the internal volume of additive cylinders 266. The bottom end of rods 270 are connected to a U-shaped carriage 272. Connected to each end of carriage 272 are linear bearing brackets 276 that slide vertically on carriage rods 274. Carriage rods 274 are vertically mounted to plate 262 at their lower end by a bracket 276 and at the upper end by a bracket 278.

Drive rod 282 is attached by a pin 280 to approximately the lower center of carriage 272. Hydraulic cylinder 264 has an internal piston which is connected to drive rod 282 so that as hydraulic fluid is applied to one side of cylinder 264 through the control of a solenoid valve (not shown) rod 282 is moved downwardly and as hydraulic fluid is applied to the other side of hydraulic cylinder 264 through the control of a solenoid valve (not shown), rod 282 is moved upwardly causing carriage 272 to move accordingly. As may be seen, the movement of carriage 272 causes rods 270 to move thereby changing the internal volume of additive cylinders 266.

Mounted at the upper end of additive cylinders 266 are tees 284. Check valves 258 are attached to one side of tees 284 and check valves 286 are connected to the other side of tees 284. Check valves 286 are connected to a source of additive as will be more fully described below. As previously stated, check valves 258 are connected through flexible tubing and tubing 256 to needles 182 and 184. Tees 284 operate to allow additive to be drawn into cylinders 266 when the piston of cylinders 266 is moved downwardly to expand the internal volume of cylinders 266. However, when hydraulic drive cylinder 264 moves upwardly to reduce the volume in cylinders 266, tees 284 operate to prevent additive from being expelled through connector 286 and instead, expel additive through check valves 258 to needles 184 and 188.

With reference to FIGS. 13, 14, and 15, a bracket 288 is attached to plate 262 and extends outwardly therefrom. A rotary encoder 290 is mounted to bracket 288. Rotary encoder 290 has an output shaft 292 upon which is mounted a gear 294. A rack 296 having mating gear teeth to engage gear 294 is mounted by a bracket 298 on linear bearing 276. Thus, as carriage 272 is moved up and down, rack 296 causes gear 294 to rotate shaft 292. Rotary encoder 290 provides electrical signals indicative of the rotation of shaft 292 so that data indicative of the relative position of carriage 272 and the corresponding internal volume of cylinders 266 can be transmitted to process control system 34. Process control system can then control the application of hydraulic fluid to cylinder 264 via solenoid valves to control the amount of additive drawn into cylinders 266 and correspondingly the amount of additive injected through needles 184 and 188 into the carcass.

Figure 8:
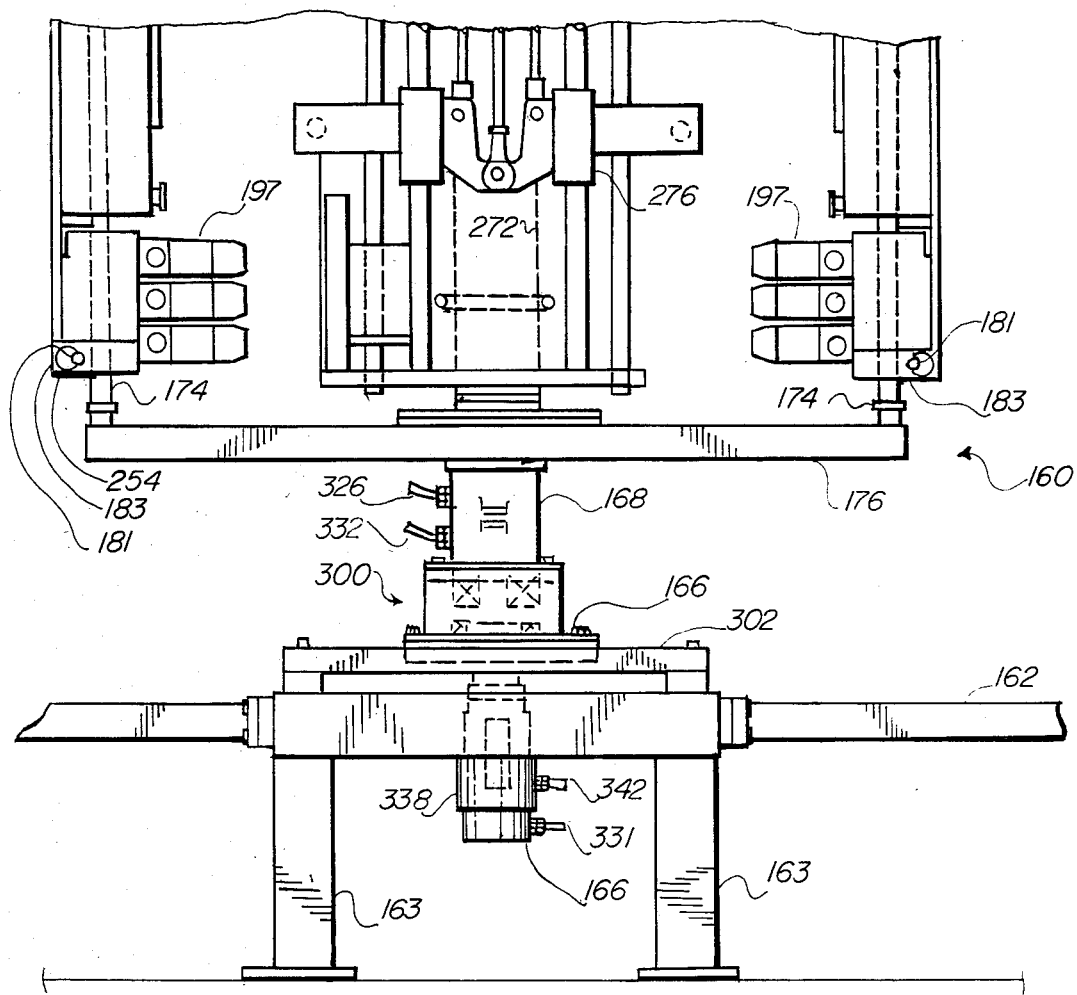
FIGS. 8A and 8B are a segmented side view of the tool drum of the processing system in accordance with the present invention.
Figure 9:
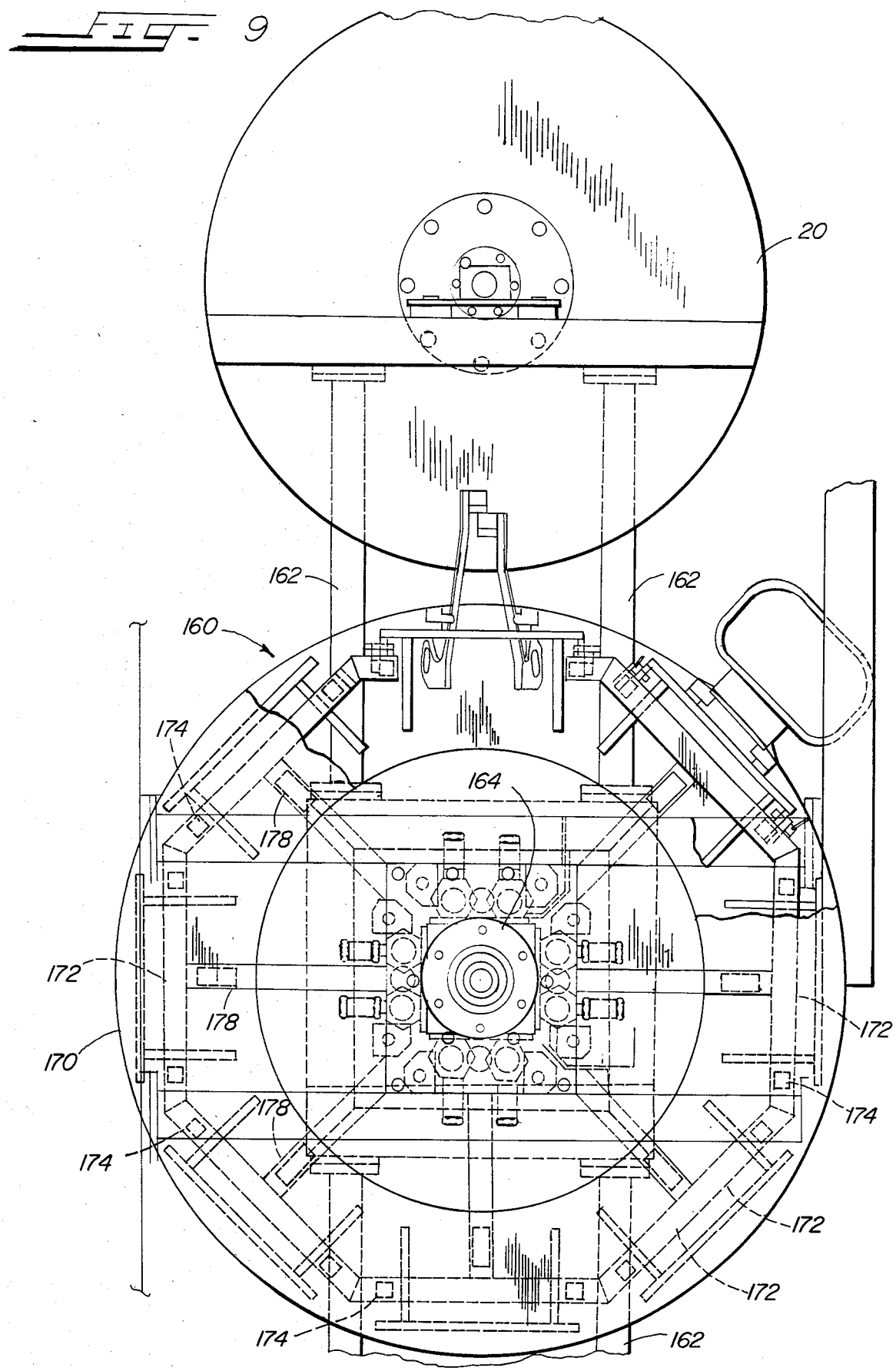
FIG. 9 is a top view of the tool-holding drum and direction changing drum in accordance with the present invention.
Figure 18:
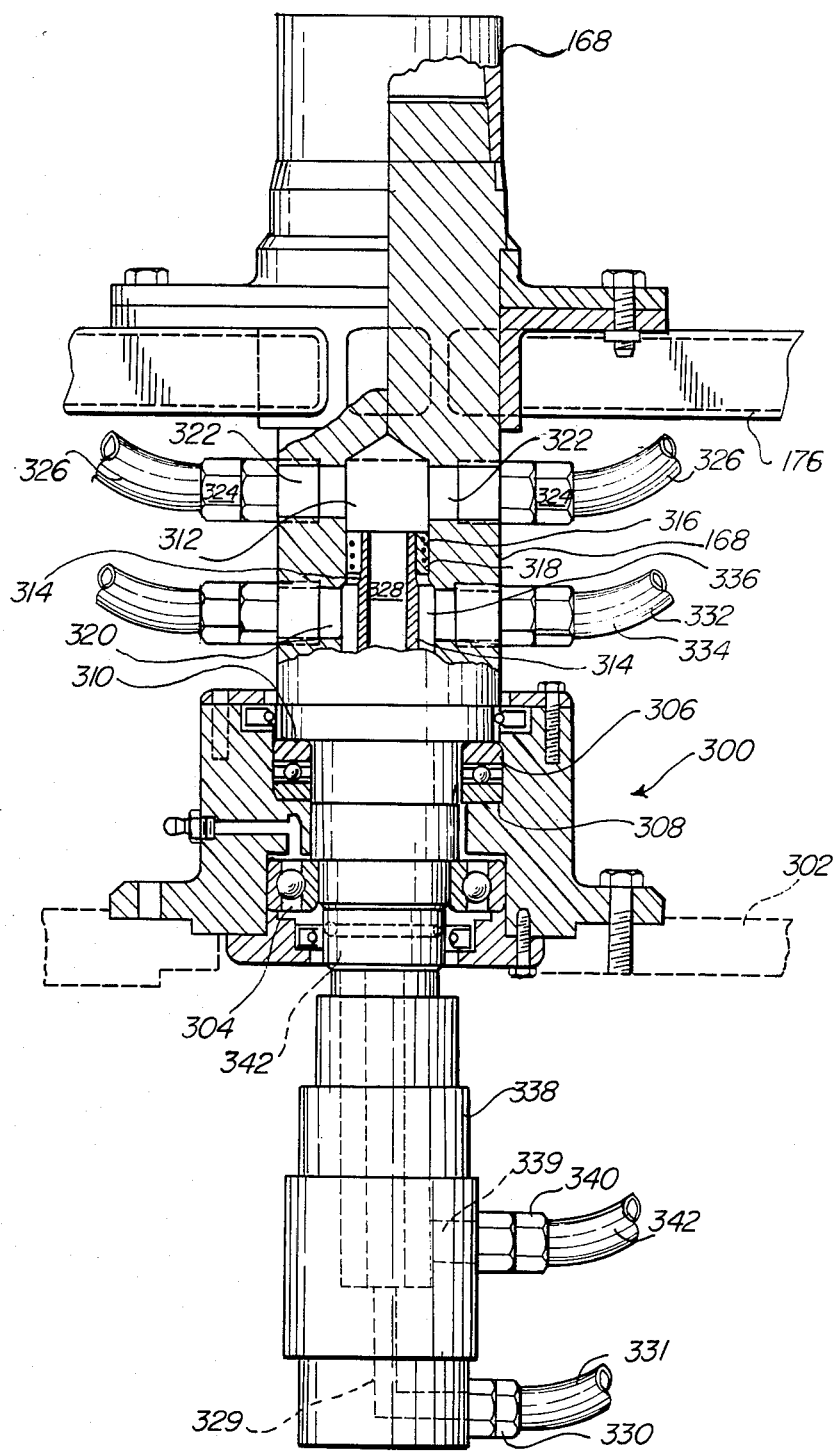
FIG. 18 is a cross-sectional partially fragmentary view of the pivotable mounting and hydraulic connection of the tool drum of the present invention.

With reference to FIGS. 8B and 18, since various operations performed on tool drum 160 are powered by hydraulic power, and since tool drum 160 is constantly rotating, a means of supplying hydraulic fluid to the rotating drum must be provided. A bearing assembly 300 is supported on a support plate 302 that is mounted on frame 162. Assembly 300 comprises a first roller bearing 304 that provides horizontal rolling support for shaft 168. A second roller bearing 306 is supported by a flange 308 of assembly 300. A flange 310 on shaft 168 rests against the upper surface of bearing 306 thereby providing vertical rolling support for shaft 168 and drum 160. A hollow channel 312 is provided along the center line from the lower end of shaft 168. A cylindrical sleeve 314 is positioned within cylindrical channel 312 and the upper end is slidably supported by an annular shaped rotary union 316. O-rings 318 are positioned in grooves in rotary union 316 to seal that rotating connection. Below rotary union 316, channel 312 has an expanded portion at 320. The hollow interior 328 of sleeve 314 communicates with an exit port 322 that communicates with hydraulic connectors 324 and hydraulic tubing 326.

Sleeve 314 forms an inner channel 328 that communicates with channel 312 and ports 322. Channel 328 also communicates with a channel 329 that extends to a lower hydraulic connector 330 mounted on rotary coupling 338. A hydraulic pump supplies hydraulic fluid under pressure through conduit 331 to connector 330 so that it may flow through channels 329, 328 and 312 to tubes 326. Tubes 326 are connected to a series of solenoid valves that control the application of hydraulic pressure to the various hydraulic cylinders of the system.

The return of hydraulic fluid is provided through tubes 332 and connectors 334 that communicate with a channel 336 formed between the surface of enlarged portion 320 of channel 312 and the outside of sleeve 314. Channel 336 extends down through shaft 168, into rotary fitting 338 through an exit port 339 to connector 340. A hydraulic return conduit 342 is connected to the hydraulic pump return. An O-ring 342 (shown on dotted line) at the bottom of shaft 168 provides a rotating seal between the inside edge of channel 336 and rotary coupling 338.

With reference to FIG. 8A, a rotary coupling 350 to allow an external source of additive to be supplied to the rotating tool drum 160 is generally shown. A rotary union 350 is connected to a conduit 352 which in turn is connected to a source of additive (not shown). Shaft 168 has an internal channel 354 (shown on dotted line) that communicates at one end with coupling 350 and the other end with quick disconnect couplings 356 which in turn are connected via flexible tubing to the check valves 286 of additive metering system 260. A rotating seal (not shown) is provided between shaft 168 and coupling 350 to prevent the leakage of fluid of additive from the system.

Figure 19:
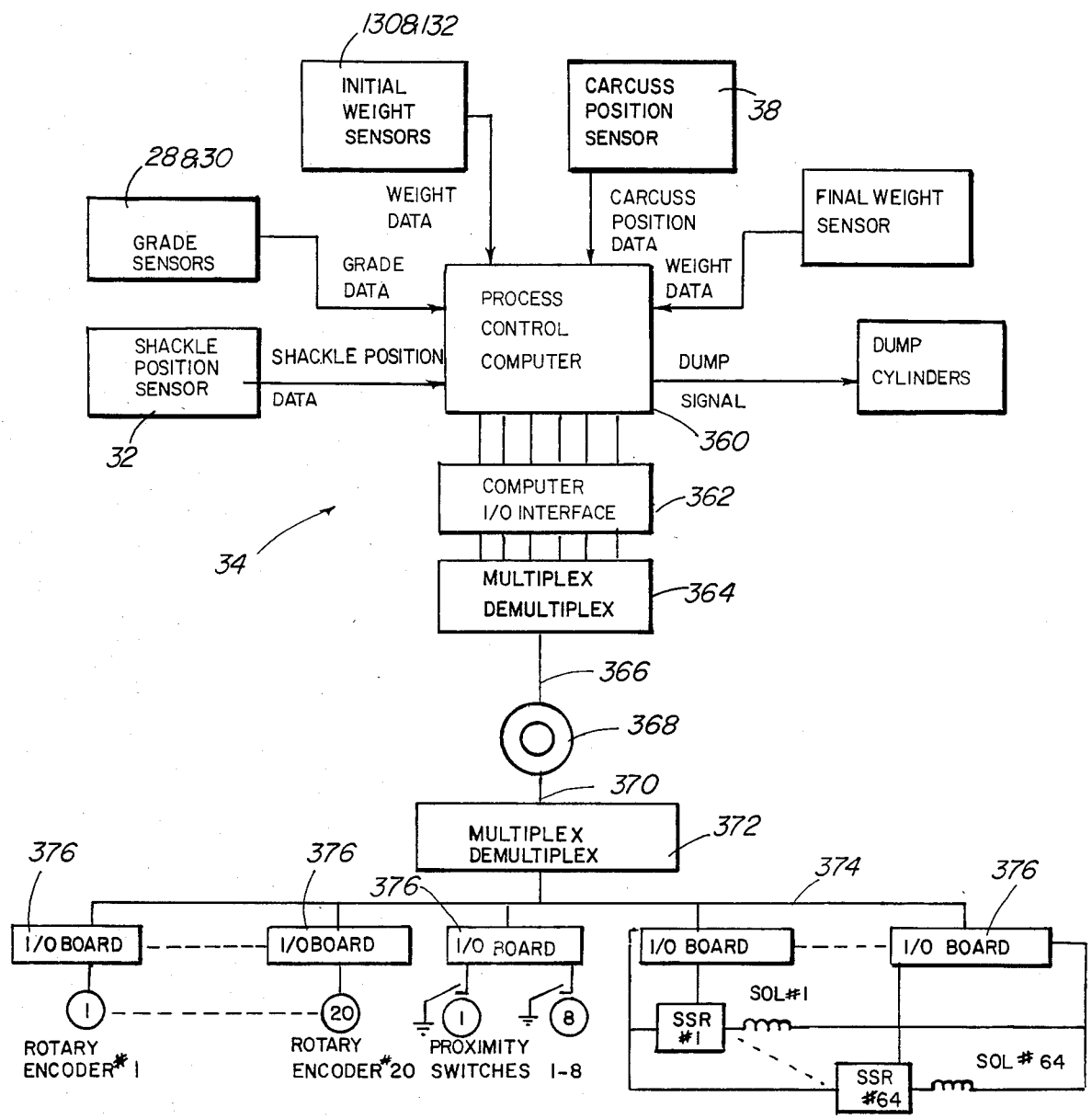
FIG. 19 is a block schematic diagram of the process control system of the present invention.

With reference to FIG. 19, the process control system 34 of the present invention is generally illustrated in block diagram form. The system 34 comprises a process control computer 360 which may be any one of a number of commercially available digital computers having the capacity to store and manipulate digital information in a predetermined manner. Shackle position sensor 32 is connected to computer 360 to provide the shackle position data and shackle count as previously indicated. Similarly, grade sensors 28 and 30 are connected to computer 360 to provide the grade data to the computer. The initial weight sensor 130 and 132 similarly provide weight data that may be interpreted by and recorded in the data processing computer 360. The carcass position sensors 38 comprising light heads 150 and 152 also are connected to the process control computer and provide carcass position data that may be interpreted by and recorded in the computer 360 for each of the carcasses by shackle number. Similarly, final weight sensors (similar to sensors 130 and 132) in weigh station 40 provide the final weight data for each carcass after injection with the basting fluid, and that data is interpreted by and recorded in the computer. The computer 360 is connected to and controls the various dump cylinders 48-52 adjacent the various dumping points to eject the carcass from the conveyor shackles 64 at the appropriate dump point based upon the data recorded for each carcass.

To control the operation of the apparatus on the tool drum 160, the process control computer is connected through a computer input/output interface 362 to a multiplex de-multiplex circuit 364 which converts the parallel output of information on a multiplicity of output lines from the computer to a serial digital train on a fiber optic connector 366. A fiber optic slip ring 368 is mounted around shaft 168 on drum 160 to permit information on stationary connnector 366 to be connected to fiber optic connector 370 that is rotating with drum 160. A second multiplex de-multiplex circuit 372 de-multiplexes the input signals on line 370 to provide parallel output information on a multiplicity of conductors 374 to control the various operations of the tool drum. The multiplex de-multiplex circuit 372 is connected via parallel conductors 374 to a series of ninety-two channels a series of eight channel input/output boards 376. Twenty of the channels of input/output boards are respectively connected to twenty rotary encoders. Four of the rotary encoders correspond to rotary encoders 290 on the four additive metering systems 260. The remaining sixteen rotary encoders correspond to the two vertical and horizontal rotary encoders 229 and 239 on the eight injecting assemblies 180.

Eight of the input/output channels of the boards 376 are connected to the eight proximity switches 205 on injecting assemblies 180 which determine when the needle arms 184 and 188 of the injecting assembly 180 have returned to the start position. Finally, sixty-four channels of the input/output boards are connected to sixty-four relay switches for the various solenoid controlled valves 197 of the system. Thirty-two of the solenoid valves 197 control the hydraulic fluid to hydraulic cylinders 228 and 246 of the needle positioning arrangement of injecting assembly 180. There are eight injecting assemblies 180 each having two cylinders 228 and 246 that each must be controlled for both the forward and backward directions. Thus, thirty-two valves are required. Sixteen of the solenoid valves 197 control the forward and reverse pivoting of the eight rotary actuators 190 and 192 on the eight injecting assemblies 180. Eight of the solenoid valves 197 control the forward and backward operation of the four hydraulic drive cylinders 264 of the four additive metering systems 260. Finally, eight of the solenoid valves 197 control the transmission of the additive from the four additive metering systems 260 to the eight injecting assemblies 180. Thus, each additive cylinder 266 is connected through a two-way solenoid valve to provide additive to two different needles on two different injecting assemblies 180 through the control of the processing control computer 360.

Figure 20:
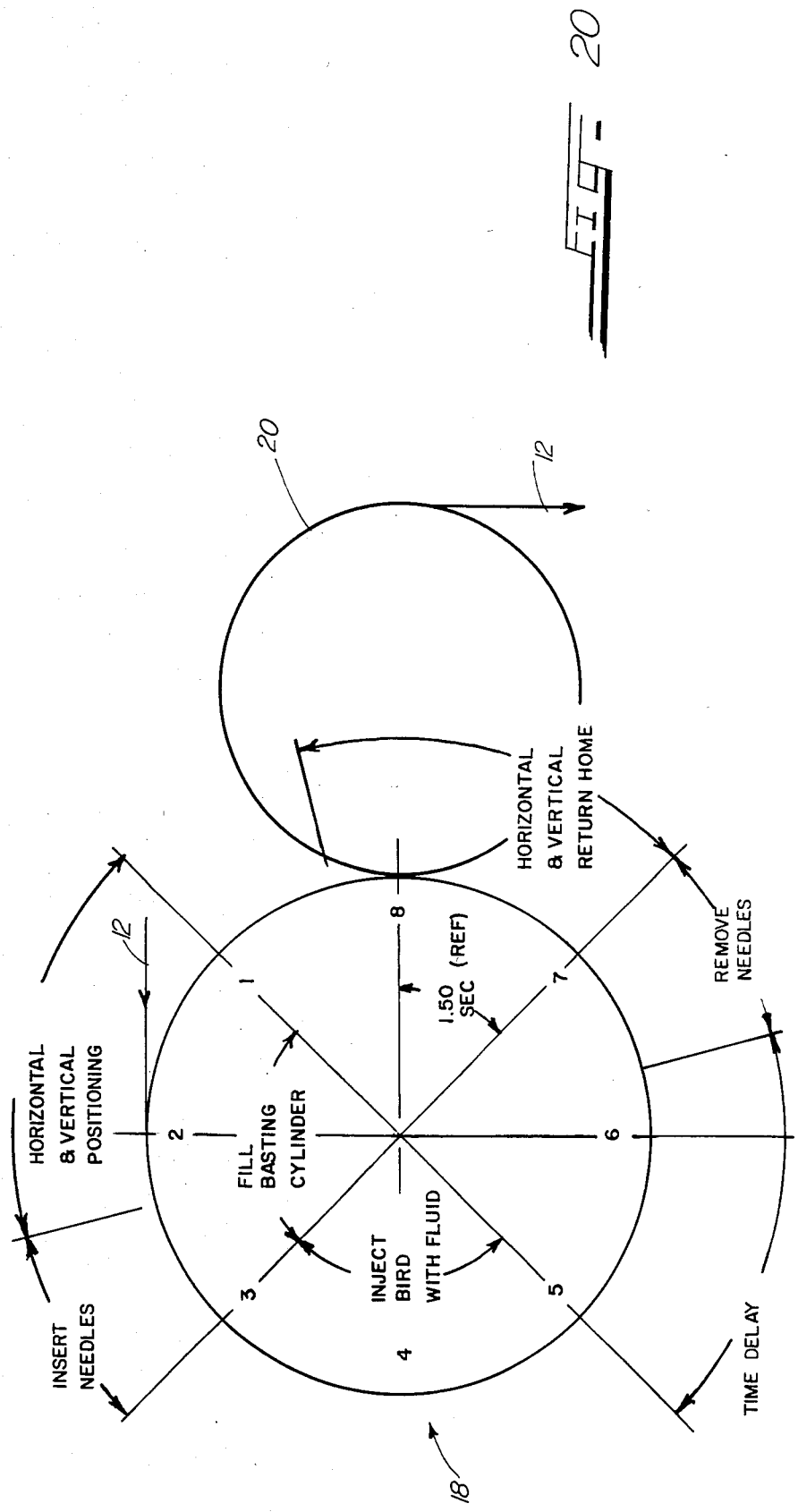
FIG. 20 is a time sequence schematic block diagram showing the sequence of operation of various functions performed on the tool drum.

With reference to FIGS. 20 and 21, the sequence of operation of the tool drum is schematically illustrated. In FIG. 20, the drum 18 is schematically illustrated and the rotation of the drum is sectioned down into eight segments. As the drum rotates to position 1, the digital control computer provides signals to the solenoid switches controlling the application of hydraulic fluid to the horizontal and vertical positioning cylinders 246 and 228 which cause the cylinders to start moving the injecting assembly 180 to the correct position to permit proper needle insertion into the carcass. The rotary encoders 229 and 239 sense the exact position of the unit and when the correct position is attained as determined by the data from the light heads 150 and 152, the digital computer shuts off the supply of hydraulic fluid to the cylinders 288 and 246.

At the same time, the computer also causes hydraulic cylinder 264 to commence moving downwardly to start drawing additive into cylinders 266. Encoder 290 determines the exact position of the pistons in cylinders 266 so that the computer will know when to shut down the hydraulic fluid to cylinder 264. When the correct amount of additive for the weight of the particular carcass has been drawn into cylinder 266 the computer shuts off the hydraulic fluid to cylinder 264. The computer calculates the exact amount of additive to be added based upon the weight information previously supplied for the respective carcass.

Before the cylinders 266 have been completely filled, the computer causes the hydraulic fluid to be applied through the solenoid valves to the rotary actuators 190 and 192 causing the arms 186 and 188 to pivot to insert needles 182 and 184 into the breast muscle of the turkey about an inch from the posterior edge of the breast. The position sensors 38 have provided information to the computer to allow the needles to be positioned such that the needles are properly inserted and travel through the breast muscle approximately one-half inch below the surface for each carcass irrespective of its size and shape.

Once the needles are fully inserted, the computer opens the solenoid valve to cause hydraulic fluid to be applied to the opposite side of cylinder 264 of the metering system 260 to cause carriage 272 to move upwardly pushing the basting additive out through couplings 258 and the needles 182 and 184 into the carcass. The end of the needles 282 and 284 have a multiplicity of small openings along about approximately two inches of the end thereof so that the additive is distributed into the breast muscle of the turkey evenly. To reduce the possibility of the additive squirting back out of the needle hole when the needle is removed, the needle is held in the inserted position for a time delay period to allow the basting additive to dissipate through the breast muscle tissue.

The computer next actuates a solenoid valve controlling the rotary actuator 190 and 192 to cause it to reverse direction and withdraw the needles from the carcass. When the needles are fully extracted, the arms engage proximity switches 205. The computer then reverses the flow of hydraulic fluid to cylinders 228 and 246 to cause the injecting assembly to return to its home start position ready for the next positioning and injection cycle.

There are eight injector assemblies on each tool drum but only four additive metering assemblies. Accordingly, for each rotation of the drum, the metering system supplies additive to two different injecting assemblies. The process control computer actuates a solenoid valve to switch the additive cylinders 266 between two opposing injecting assemblies thereby minimizing the number of injection assemblies required for each tool drum. With reference to FIG. 21, the four metering systems are identified as A, B, C, D. Thus, it may be seen that for each complete rotation each metering system is filled and injected twice.

After injection, the second weigh station 40 which is substantially the same as that illustrated in FIGS. 4 and 5 weighs each carcass as it is conveyed to assure that the proper amount of additive has been added and that the additive has not exceeded predetermined limits. The process control computer can by comparing the initial weight with the final weight determine whether the limits have been exceeded. If they have, the computer will cause dump cylinder 48 to actuate as the corresponding shackle passes causing the carcass to be dropped at the reject dump point 43.

The flavor-enhancing additive is not injected into carcasses that do not meet certain rated grade standards. Thus, if a carcass is loaded at grade point 26, for example, sensor 30 will inform the computer that that carcass is "undergrade". When that carcass reaches tool drum 18, the computer will shut down operation of the injecting unit for that carcass so that no additive is injected. Such undergrade carcasses are then ejected from the conveyor through the operation of dump cylinder 49 under the control of the process control system 34. Also, the weight information supplied by the final weight station 40 is interpreted by the process control system to cause carcasses within pre-specified size ranges to be ejected at different points 45, 46, 47 thereby facilitating the bagging and packaging of the carcasses.

Thus, it may be seen that a fully-automated system for injecting a flavor-enhancing additive to turkey carcasses has been described. However, the present system may be utilized for other desired tasks in poultry processing. One of the problems experienced with the automated processing of turkeys has been that the turkey vary so substantially in size and shape that it has been impossible to fully automate turkey processing. However, the present system provides a means of sensing the position preselected portions of the anatomy of the carcass of the turkey and then moving a tool to the proper location to perform the desired task at the preselected point on the anatomy. For example, similar techniques as illustrated herein may be used to permit the automatic evisceration of turkey carcasses by mechanical means rather than by hand labor by determining the position of the visceral vent opening of the carcass and then moving an eviscerating tool to the proper position to perform the eviscerating of the carcass mechanically. Other aspects of turkey processing at a specific point on the anatomy of the carcass could be performed using similar techniques.

It should be expressly understood that various changes, modifications, or alterations may be made in the preferred embodiment illustrated herein without departing from the spirit and scope of the present invention as defined in the appended claims.

What is claimed is:

1. A system for processing poultry carcasses comprising:
   data processing means for receiving and storing data, manipulating said data in a predetermined manner and providing output control signals in accordance with the manipulation of said data;

means to convey said carcasses from a loading point to a discharge point;

means to sense the position of at least one preselected part of the anatomy of said carcass relative to said means to convey as said carcass is being conveyed and provide data to said data processing means indicative of the position of said preselected part;

tool means for performing a desired function on said carcass; said tool means adapted to move with said carcass as it is being conveyed by said means to convey so that the desired function may be performed as the carcass is being conveyed;

means to move said tool means relative to said means to convey to a desired position relative to the position of said preselected part of said carcass on said means to convey in response to signals from said data processing means so that said tool means can perform the desired function at a predetermined position on said carcass as said carcass is being conveyed by said means to convey.

2. A system for processing poultry carcasses as claimed in claim 1 wherein said tool means is a means for injecting a liquid additive into the carcass.

3. A system as claimed in claim 2 also comprising a means to weigh the carcass as it is being conveyed and transmit data indicative of that weight to the data processing means; and a means to control the amount of additive injected into said carcass in response to control signals from said data processing means corresponding to the data indicative of the weight of the carcass so that a predetermined a amount of additive per unit weight of said carcass is injected.

4. A system for processing poultry carcasses as claimed in claim 3 wherein said means for injecting comprises a hollow needle having at least one opening at each end thereof, said needle mounted so that it can be inserted into said carcass, a hollow cylinder, a circular piston within said cylinder adapted to move within said cylinder to change the internal volume of said cylinder; a source of additive, an outlet from said cylinder, at least one check valve mounted at said outlet; a first hollow tube connecting said at least one check valve to said source of additive and a second hollow tube connecting said at least one check valve to said needle so that when said plunger moves to expand the internal volume of said cylinder, additive is drawn into said cylinder, and when said plunger moves to reduce the internal volume of said cylinder said additive is conveyed through said second tube and through said needle into the carcass.

5. A system as claimed in claim 4 wherein said means to control the amount of additive injected comprises means to control the movement of said plunger in response to signals from said data processing means so that the internal volume of said cylinder when said plunger ceases drawing additive into said cylinder is equal to the amount of additive to be injected into said carcass.

6. A system for processing poultry carcasses as claimed in claim 1 wherein said means to sense the position of at least one part of the anatomy of said carcass comprises a means of providing an elongated beam of infrared light through the path of travel of said carcasses at a predetermined position on said carcass as it is conveyed, and means to sense the position of the edge of said carcass at it travels through said elongated beam of infrared light.

7. A system for processing poultry as claimed in claim 1 further comprising means to weigh said carcass as it is being conveyed and transmit data indicative of that weight to said data processing means, and means for removing said carcasses from said means to convey at different preselected points corresponding to preselected weight ranges of said carcass in response to control signals from said data processing means.

8. A system as claimed in claim 1 further comprising means to sense the rated quality of said carcass and to transmit data indicative of carcass quality to said data processing means, and means to remove said carcass from said means to convey at preselected points dependent on the rated quality of said carcass in response to control signal from said data processing means.

9. A system for processing poultry carcasses comprising:

data processing means for receiving and storing data, manipulating said data and providing output control signals in accordance with the manipulation of said data;

means to convey said carcasses from a loading point to a discharge point;

first means to weigh said carcass as it is being conveyed from said loading point and provide data indicative of that weight to said data processing means;

means to sense the position of at least one preselected part of the anatomy of said carcass relative to said means to convey and provide data indicative of that position to said data processing means;

means for injecting a liquid additive into said carcass in proportion to the weight of said carcass, said means for injecting mounted to travel with said carcass for a period of time as it is being conveyed on said means to convey so that said carcass can be injected as it is being conveyed;

means for moving said means to inject relative to said means to convey in response to control signals from said data processing means so that said means to inject injects said additive in said preselected part of the anatomy of said carcass at the position sensed by said means to sense.

10. A system for processing poultry carcasses as claimed in claim 9 further comprising means to weight said carcass after injecting and transmit data indicative of that weight to said data processing means, and means to remove said carcasses at predetermined positions dependent upon the weight of said carcass in response to control signals from said data processing means.

11. A system as claimed in claim 9 further comprising means to sense the rated quality of each of said carcasses as it is being conveyed and transmitting data indicative of the quality of that carcass to said data processing means.

12. A system as claimed in claim 11 further comprising means to remove said carcass from said means to convey at different predetermined positions dependent upon the rated quality of each carcass in response to control signals from said data processing means.

13. A system as claimed in claim 9 wherein said means for injecting comprises an elongated hollow needle having at least one opening at each end, said needle mounted so that it can be inserted into said carcass, said needle also being mounted on said means for moving so that it can be moved relative to said means to convey in response to control signals from said data processing means to move said needle to a position where it will be inserted at a preselected point of said carcass determined by said means to sense.

14. A system as claimed in claim 13 wherein said means to move is powered by hydraulic pressure, and said hydraulic pressure is supplied through a rotating coupling within said pivoting shaft.

15. A system as claimed in claim 9 wherein said means for injecting and means for moving are mounted on a rotating drum adapted to move with said means to convey on a pivoting shaft, and said control signals from said data processing means are conveyed to said means for injecting and said means for moving via a rotating connector mounted around said pivoting shaft.

16. A system as claimed in claim 15 wherein said rotating connector is a photo-optic slip ring.

* * * * *

UNITED STATES PATENT AND TRADEMARK OFFICE
CERTIFICATE OF CORRECTION

PATENT NO. : 4,627,007
DATED : December 2, 1986
INVENTOR(S) : Theodore R. Muschany It is certified that error appears in the above-identified patent and that said Letters Patent are hereby corrected as shown below:

Col. 4, line 1 - insert -- a -- before "bottom".

Col. 4, line 45 - delete "passes" and insert -- pass --.

Col. 6, line 66 - delete "a" before "cylindrical".

Col. 15, line 31 - delete "a" second occurrence before "amount".

Col. 15, line 67 - delete "at" and insert -- as --.

Col. 16, line 45 - delete "weight" and insert -- weigh --.

Signed and Sealed this

Fifteenth Day of September, 1987

Attest:

DONALD J. QUIGG

Attesting Officer

Commissioner of Patents and Trademarks